(12) United States Patent
Nishio

(10) Patent No.: US 10,223,049 B2
(45) Date of Patent: Mar. 5, 2019

(54) IMAGE FORMING SYSTEM AND IMAGE FORMING METHOD

(71) Applicant: KYOCERA Document Solutions Inc., Osaka-shi, Osaka (JP)

(72) Inventor: Takatoshi Nishio, Osaka (JP)

(73) Assignee: KYOCERA DOCUMENT SOLUTIONS, INC. (JP)

(*) Notice: Subject to any disclaimer, the term of this patent is extended or adjusted under 35 U.S.C. 154(b) by 0 days.

(21) Appl. No.: 15/834,778

(22) Filed: Dec. 7, 2017

(65) Prior Publication Data

US 2018/0165047 A1 Jun. 14, 2018

(51) Int. Cl.

| | |
|---|---|
| G06F 3/12 | (2006.01) |
| H04N 1/00 | (2006.01) |
| B41F 33/16 | (2006.01) |
| G06Q 30/02 | (2012.01) |

(52) U.S. Cl.
CPC ............ G06F 3/1243 (2013.01); B41F 33/16 (2013.01); G06F 3/1203 (2013.01); G06F 3/1211 (2013.01); G06F 3/1263 (2013.01); G06F 3/1287 (2013.01); G06F 3/1288 (2013.01); G06Q 30/02 (2013.01); H04N 1/00 (2013.01); G06F 3/125 (2013.01); G06Q 30/0207 (2013.01)

(58) Field of Classification Search
CPC .... G06F 3/1243; G06F 3/1288; G06F 3/1203; G06F 3/1263; G06F 3/1211; G06F 3/1287; G06F 3/125; B41F 33/16; G06Q 30/02; G06Q 30/0207; H04N 1/00
See application file for complete search history.

(56) References Cited

U.S. PATENT DOCUMENTS

2015/0212771 A1 7/2015 Hori

FOREIGN PATENT DOCUMENTS

| | | |
|---|---|---|
| JP | 2000250726 A | 9/2000 |
| JP | 2015138505 A | 7/2015 |

*Primary Examiner* — Christopher Wait
(74) *Attorney, Agent, or Firm* — Calfee, Halter & Griswold LLP

(57) ABSTRACT

An image forming system includes: a server; and an image forming apparatus, in which the server acquires divided-images obtained by dividing an original image, and provides the divided-images to the apparatus, acquires a dividing-printing-rule for determining which divided-image of the divided-images is printed at which position, and provides the rule to the apparatus, information on a divided-image to be printed and a printing position of the divided-image to be printed being described in the rule for each time when printing the image to be printed, and provides present time to the apparatus as time information, and the apparatus acquires the divided-images to be printed, the rule, and the time information from the server, selects, based on the time information and the rule, the divided-image to be printed from the divided-images and determines the printing position of the divided-image to be printed, and prints the selected divided-image at the printing position.

11 Claims, 14 Drawing Sheets

Original image

17a: Divided image A

17d: Divided image D

17e: Dividing-printing rule

| Day of week | Time | Divided image to be printed | Printing position |
|---|---|---|---|
| Monday | 0:00 ~ 5:59 | A | Upper left |
| | 6:00 ~ 11:59 | B | Upper right |
| | 12:00 ~ 17:59 | C | Lower left |
| | 18:00 ~ 23:59 | D | Lower right |
| Tuesday | 0:00 ~ 5:59 | B | Upper right |
| | 6:00 ~ 11:59 | C | Lower left |
| | 12:00 ~ 17:59 | D | Lower right |
| | 18:00 ~ 23:59 | A | Upper left |
| Wednesday | 0:00 ~ 5:59 | C | Lower left |
| ... | ... | ... | ... |

FIG.7

IMAGE FORMING SYSTEM AND IMAGE FORMING METHOD

INCORPORATED BY REFERENCE

This application claims the benefit of Japanese Priority Patent Application JP 2016-240168 filed Dec. 12, 2016, the entire contents of which are incorporated herein by reference.

FIELD

The present disclosure typically relates to an image forming system that is installed in a convenience store and prints an image, and to an image forming method.

BACKGROUND

There is known a technology for improving printing efficiency by combining an image forming apparatus and a server compatible with a network.

It is desirable to provide an image forming system and an image forming method that can allow customers to visit convenience stores.

SUMMARY

An image forming system according to an embodiment of the present technology includes: a server; and an image forming apparatus connected to the server via a network, the server including a first communication device that communicates with the image forming apparatus, a first storage device, a first ROM that stores a first information processing program, and a first processor that executes the first information processing program, the image forming apparatus including a second communication device that communicates with the server, a second storage device, an image forming device that forms an image, a second ROM that stores a second information processing program, and a second processor, in which the first processor of the server executes the first information processing program to acquire a plurality of divided images, store the plurality of divided images in the first storage device, and provide the plurality of divided images to the image forming apparatus, the plurality of divided images being obtained by dividing an original image, all of the plurality of divided images being to be combined to be the original image, acquire a dividing-printing rule, store the dividing-printing rule in the first storage device, and provide the dividing-printing rule to the image forming apparatus, the dividing-printing rule being for determining which divided image of the plurality of divided images is printed at which position, information on a divided image to be printed and a printing position of the divided image to be printed being described in the dividing-printing rule for each time when printing the image to be printed, and provide present time to the image forming apparatus as time information, and the second processor of the image forming apparatus executes the second information processing program to acquire the plurality of divided images to be printed from the server, and store the divided images in the second storage device, acquire the dividing-printing rule from the server, and store the dividing-printing rule in the second storage device, acquire the time information from the server, and store the time information in the second storage device, select, based on the time information and the dividing-printing rule, the divided image to be printed from the plurality of divided images stored in the second storage device, and determine the printing position of the divided image to be printed, and control the image forming device to print the selected divided image at the printing position.

An image forming system according to an embodiment of the present technology includes: a server; and an image forming apparatus connected to the server via a network, the server including a first communication device that communicates with the image forming apparatus, a storage device, a first ROM that stores a first information processing program, and a first processor that executes the first information processing program, the image forming apparatus including a second communication device that communicates with the server, an image forming device that forms an image, a second ROM that stores a second information processing program, and a second processor, in which the first processor of the server executes the first information processing program to acquire a plurality of divided images, and store the plurality of divided images in the storage device, the plurality of divided images being obtained by dividing an original image, all of the plurality of divided images being to be combined to be the original image, acquire a dividing-printing rule, and store the dividing-printing rule in the storage device, the dividing-printing rule being for determining which divided image of the plurality of divided images is printed at which position, information on a divided image to be printed and a printing position of the divided image to be printed being described in the dividing-printing rule for each time when printing the image to be printed, hold present time as time information, and select, based on the time information and the dividing-printing rule, the divided image to be printed from the plurality of divided images stored in the storage device, determine the printing position of the divided image to be printed, and provide information on the selected divided image and the determined printing position in response to a request from the image forming apparatus, and the second processor of the image forming apparatus executes the second information processing program to request information on the divided image and the printing position to be printed from the server, and acquire the information on the divided image and the printing position provided from the server, and control the image forming device to print the acquired divided image at the printing position.

An image forming method according to an embodiment of the present technology is an image forming method for an image forming system including a server and an image forming apparatus connected to each other via a network, the method including: by the server, acquiring a plurality of divided images, storing the plurality of divided images in a first storage device, and providing the plurality of divided images to the image forming apparatus, the plurality of divided images being obtained by dividing an original image, all of the plurality of divided images being to be combined to be the original image; acquiring a dividing-printing rule, storing the dividing-printing rule in the first storage device, and providing the dividing-printing rule to the image forming apparatus, the dividing-printing rule being for determining which divided image of the plurality of divided images is printed at which position, information on a divided image to be printed and a printing position of the divided image to be printed being described in the dividing-printing rule for each time when printing the image to be printed; and providing present time to the image forming apparatus as time information; and by the image forming apparatus, acquiring the plurality of divided images to be printed from the server, and storing the divided images in a second storage device; acquiring the dividing-printing rule from the server, and storing the dividing-printing rule in the second storage device; acquiring the time information from the server, and storing the time information in the second storage device; selecting, based on the time information and the dividing-printing rule, the divided image to be printed from the plurality of divided images stored in the second storage device, and determining the printing position of the divided image to be printed; and controlling the image forming device to print the selected divided image at the printing position.

These and other objects, features and advantages of the present disclosure will become more apparent in light of the following detailed description of best mode embodiments thereof, as illustrated in the accompanying drawings.

BRIEF DESCRIPTION OF FIGURES

FIG. 7 shows an example of a dividing-printing rule;

DETAILED DESCRIPTION

Hereinafter, embodiments of the present disclosure will be described with reference to the drawings.

First Embodiment

Figure 1:
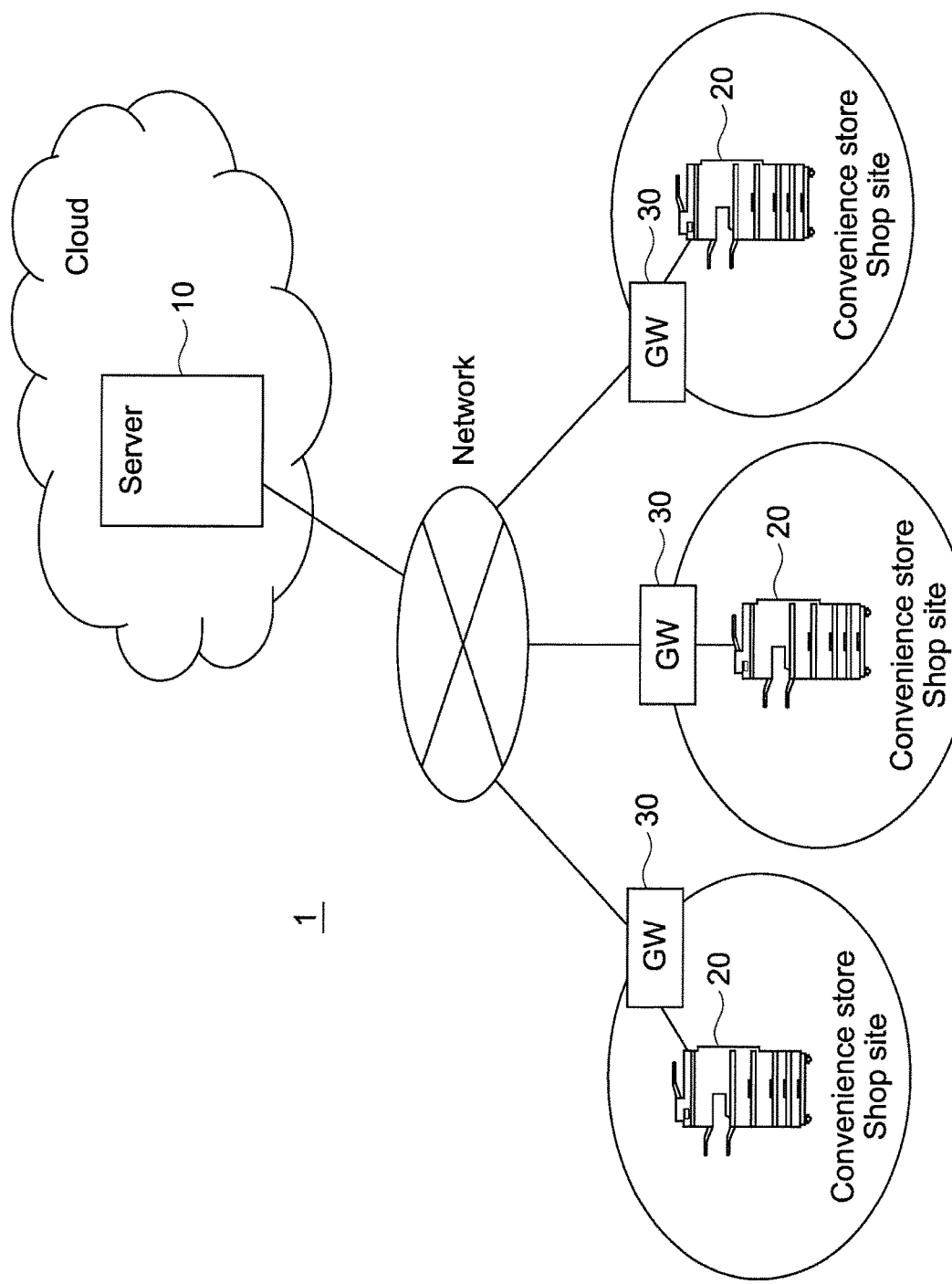
FIG. 1 shows a configuration of an entire image forming system 1 according to a first embodiment of the present disclosure.

[Entire Configuration]
First, a configuration of an entire image forming system 1 according to a first embodiment of the present disclosure will be described. FIG. 1 shows the configuration of the entire image forming system 1 according to the first embodiment of the present disclosure.

The image forming system 1 includes a server 10 installed in the cloud, an image forming apparatus 20 installed in a shop site of each convenience store, and a gateway (GW) 30. The gateway 30 is connected to the server 10 and the image forming apparatus 20 via a network, and relays communication between the server 10 and the image forming apparatus 20.

An administrator or the like of the server 10 acquires an original image of a discount coupon to be distributed in convenience stores, divides the acquired original image into divided images, and causes the server 10 to store the divided images.

Further, the administrator or the like of the server 10 determines a dividing-printing rule, and causes the server 10 to store the dividing-printing rule. The dividing-printing rule defines which divided image is to be printed at which time (e.g., day of the week and time zone).

Each image forming apparatus 20 acquires the divided images, the dividing-printing rule, and time information from the server 10, and prints the divided image on a sheet at an appropriate position based on a user's instruction.

By performing dividing-printing (hereinafter, printing one "divided image" will be referred to as "dividing-printing") a plurality of times, a user acquires a discount coupon on which the same image as the original image is printed. The user uses the acquired discount coupon at a shop, and can purchase a product, service, or the like at a discount price.

In order to complete the discount coupon, the user needs to go to a convenience store many times at intervals (like stamp rally) and perform printing. Therefore, it is possible to increase the user's visit frequency.

The configuration of the entire image forming system 1 according to the first embodiment of the present disclosure has been described heretofore.

[Regarding Image Dividing]
Next, a divided image used in the image forming system 1 will be described. FIGS. 3 to 6 each show a divided image used in the image forming system 1. Note that herein, the "divided image" is obtained by dividing an original image, and all of the divided images are to be combined to be the original image.

Figure 2:
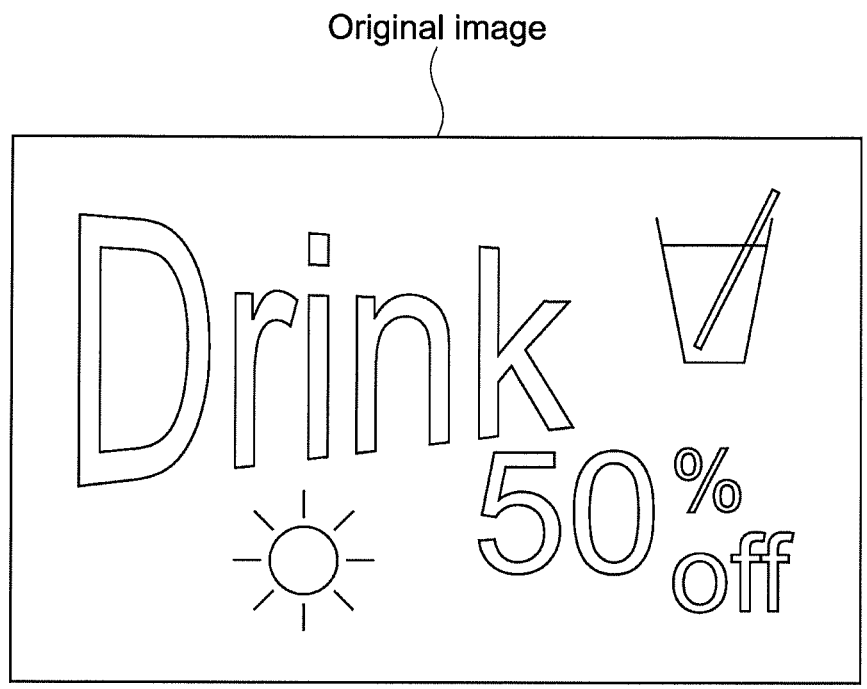
FIG. 2 shows an original image used in the image forming system 1.

FIG. 2 shows an original image before division. In an example shown in FIG. 2, a coupon for making the price of drinks sold at shops 50% off is shown.

Figure 3:
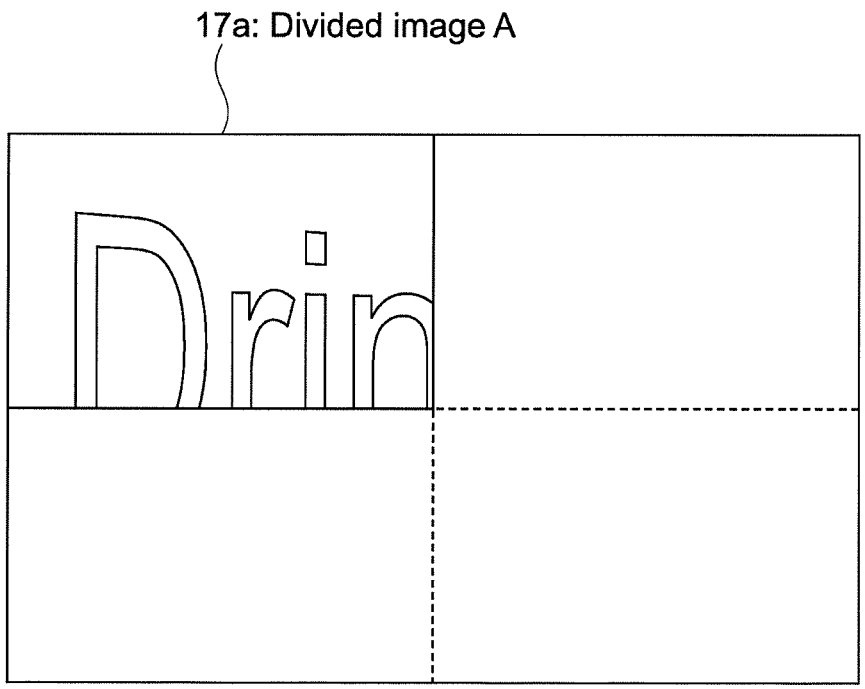
FIG. 3 shows a divided image used in the image forming system 1.

FIG. 3 shows a divided image located on the upper left obtained by dividing the original image into four images.

Figure 4:
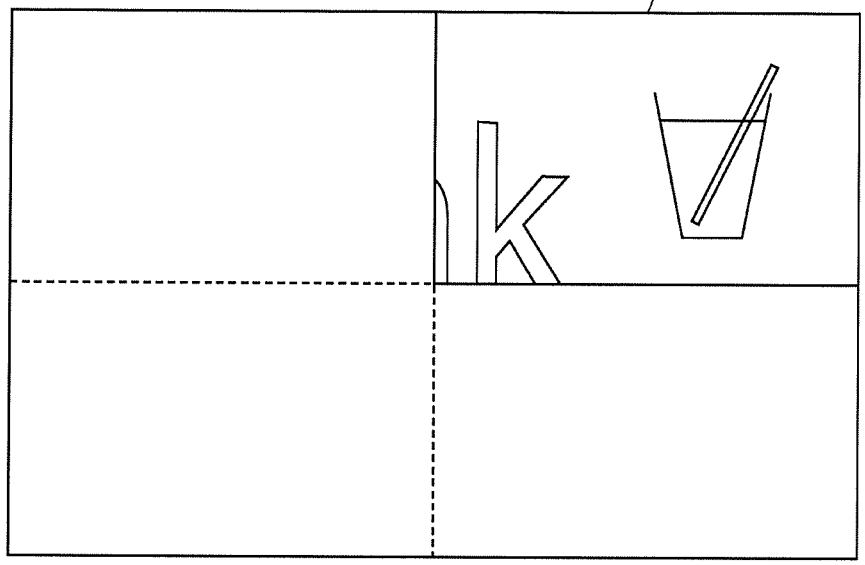
FIG. 4 shows a divided image used in the image forming system 1.

FIG. 4 shows a divided image located on the upper right obtained by dividing the original image into four images.

Figure 5:
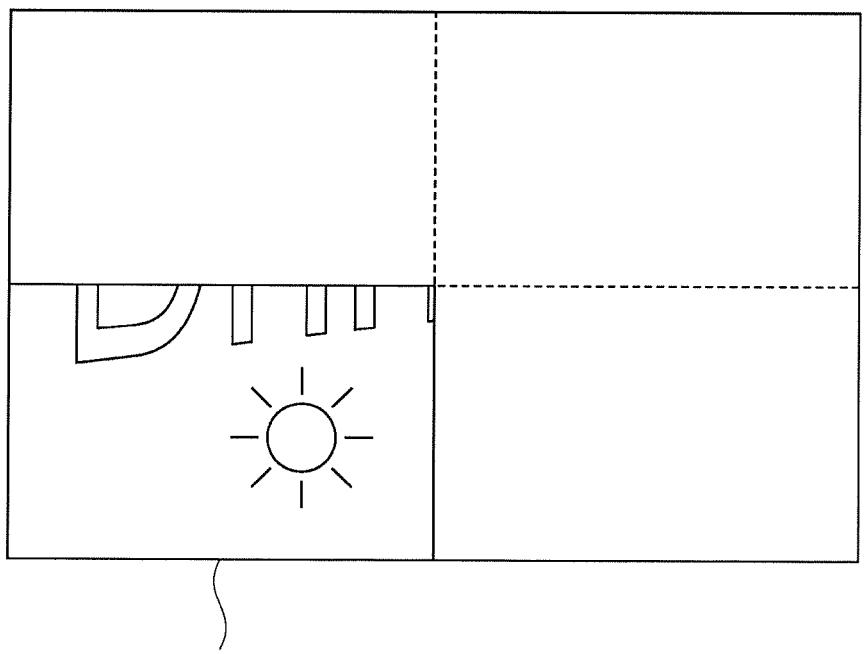
FIG. 5 shows a divided image used in the image forming system 1.

FIG. 5 shows a divided image located on the lower left obtained by dividing the original image into four images.

Figure 6:
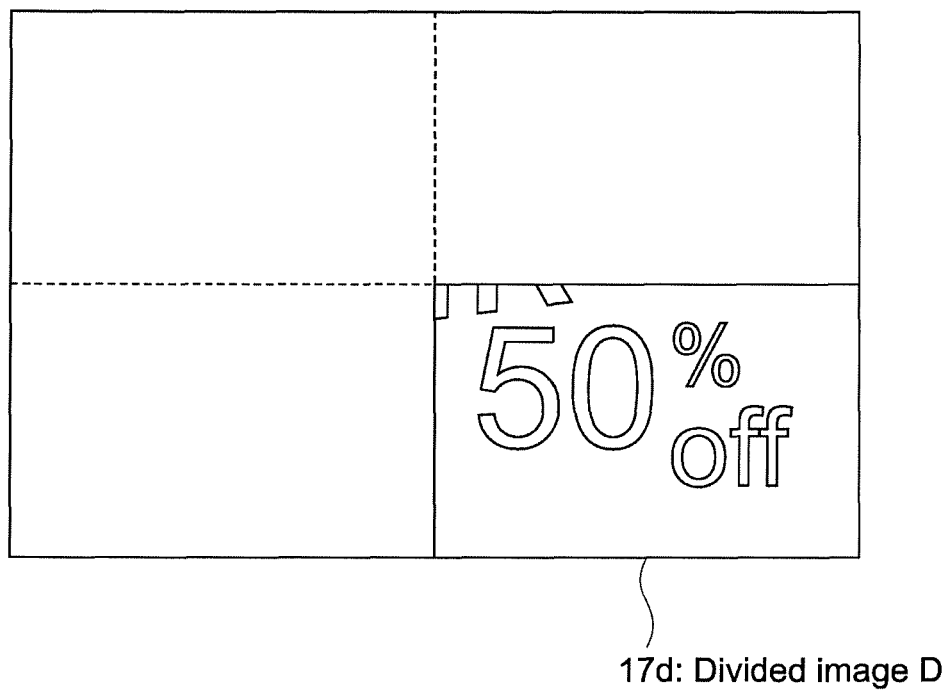
FIG. 6 shows a divided image used in the image forming system 1.

FIG. 6 shows a divided image located on the lower left obtained by dividing the original image into four images.

The user can acquire a coupon on which the same image as the original image is printed by printing all the four divided images on one sheet.

The divided images each have a size equal to one quarter of the size of the original image. It is necessary to manage not only each divided image but also position information relating to which position on the sheet the divided image is printed.

Note that in the above description, the original image is divided into four images. This represents that the user is caused to visit a shop four times to acquire a coupon after completing the image (original image) by performing dividing-printing four times. How many images the original image is divided into can be changed depending on how many times the user is caused to perform printing to acquire a coupon.

For example, in the case of a discount coupon for a movie ticket to be released "after a week", the original image may be divided into seven images, expecting that the user visits a shop in the same time zone every day for a week.

Further, in the case of a coupon offering a high discount rate for a high priced product, since the value of the coupon is considered high, it is expected that the user does not give up on the way even in the case where he/she is requested to visit a shop many times. In this regard, the number of divisions may be set to 10 on the assumption that the user visits the shop many times.

Further, in the case of a coupon offering a low discount rate, since the value of the coupon is considered low, the number of divisions may be set to, for example, two so that the coupon is completed by vising the shop only few times. The coupon may be acquired by visiting the shop several times.

The divided image used in the image forming system 1 has been described.

[Regarding Dividing-Printing Rule]

Next, the dividing-printing rule will be described. FIG. 7 shows an example of a dividing-printing rule. The dividing-printing rule is a rule for determining, based on time information, which divided image of the plurality of divided images is printed.

As shown in FIG. 7, the dividing-printing rule defines a divided image to be printed and a printing position of the divided image for each time. Note that assumption is made that the dividing-printing rule includes all of the divided images obtained by dividing the original image.

As shown in FIG. 7, in the case where a user performs dividing-printing on Monday between 6:00 to 11:59, the image forming system 1 prints a divided image B at an upper right position of a sheet (in the case where each divided image has a size equal to one quarter of the size of the original image).

Further, as shown in FIG. 7, focusing on the same time zone, for example, in the time zone from 0:00 to 5:59, a divided image A is printed on Monday, the divided image B is printed on Tuesday, a divided image C is printed on Wednesday, and a divided image D is printed on Thursday (not shown).

According to the dividing-printing rule shown in FIG. 7, the user is can complete and acquire the coupon in one day, by visiting the shop to perform dividing-printing at 5 am, 7 am, 3 pm, and 9 pm on Monday.

Further, the user can complete and acquire the coupon without difficulty by visiting the shop to perform dividing-printing in the same time zone (e.g., 1 pm) every day from Monday to Thursday.

Note that the dividing-printing rule may be released to visitors to convenience stores. In this case, the visitors can adjust the visit date and time by referring to the dividing-printing rule.

The dividing-printing rule has been described heretofore.

[Configuration of Server]

Figure 8:
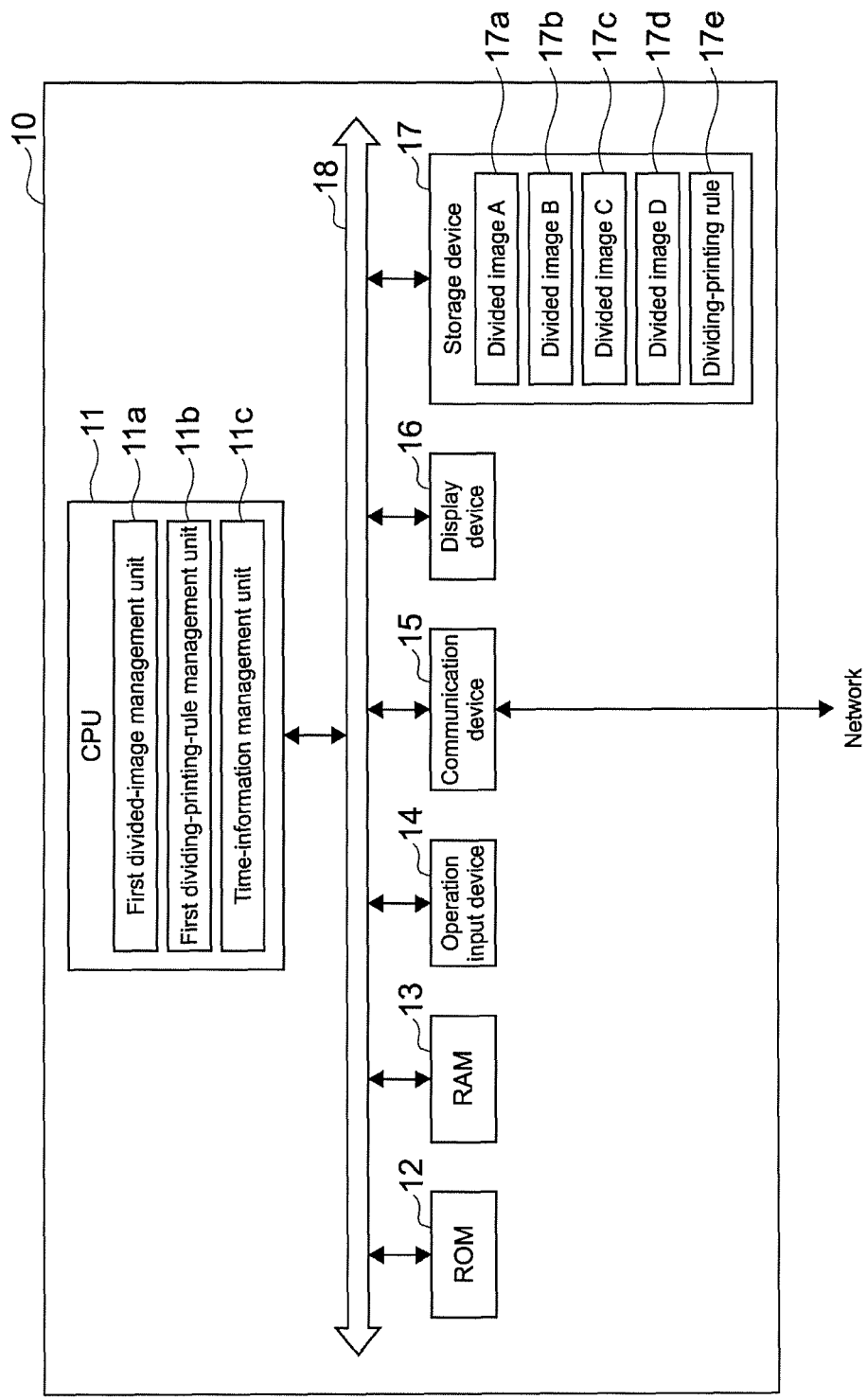
FIG. 8 shows a configuration diagram in the case where a server 10 is a general-purpose computer.

Next, a configuration of the server 10 will be described. The server 10 may be constituted of dedicated hardware or software, or may be a general-purpose computer. FIG. 8 shows a configuration diagram in the case where the server 10 is a general-purpose computer.

As shown in FIG. 8, the server 10 includes a CPU (Central Processing Unit) 11, a ROM (Read Only Memory) 12, a RAM (Random Access Memory) 13, an operation input device 14, a communication device 15 (first communication device), a display device 16, and a storage device 17 (first storage device), and these blocks are connected to each other via a bus 18.

The ROM 12 fixedly stores a plurality of programs such as firmware for executing various types of processing, and data. The RAM 13 is used as a work area of the CPU 11 and temporarily stores an OS (Operating System), various applications being executed, and various types of data being processed.

The storage device 17 is, for example, an HDD (Hard Disk Drive), a flash memory, or other nonvolatile memories. The storage device 17 stores the OS, various applications, various types of data, a divided image A 17a, a divided image B 17b, a divided image C 17c, a divided image D 17d, and a dividing-printing rule 17e. Note that the number of divided images is changed depending on the number of divisions of the original image.

The communication device 15 is connected to a network for sending/receiving information to/from the image forming apparatus 20 and the gateway 30.

Of the plurality of programs stored in the ROM 12 or the storage device 17, the CPU 11 loads a program in the RAM 13 in response to a command input via the operation input device 14, and appropriately controls the display device 16 and the storage device 17 according to the loaded program.

The operation input device 14 is, for example, a pointing device such as a mouse, a keyboard, a touch panel, or other operation devices.

The display device 16 is, for example, a liquid crystal display, an EL (Electro-Luminescence) display, or a plasma display.

Next, functional blocks will be described. When the CPU 11 of the server 10 executes a program (first information processing program), the CPU 11 operates as the functional blocks described below.

The functional blocks that the CPU 11 of the server 10 realizes include a first divided-image management unit 11a, a first dividing-printing-rule management unit 11b, and a time-information management unit 11c.

The first divided-image management unit 11a acquires, from an administrator of the server 10 or the like, the divided image 17a to 17d obtained by dividing an original image such as a coupon, and stores the acquired divided images 17a to 17d in the storage device 17. Further, the first divided-image management unit 11a provides the divided images 17a to 17d stored in the storage device 17 to each image forming apparatus 20 via the gateway 30.

The first dividing-printing-rule management unit 11b acquires the dividing-printing rule 17e created by the administrator of the server 10 or the like, and stores the acquired dividing-printing rule 17e in the storage device 17. Further, the first dividing-printing-rule management unit 11b provides the dividing-printing rule 17e stored in the storage device 17 to each image forming apparatus 20 via the gateway 30.

The time-information management unit 11c provides the present time (e.g., day of the week, time) as time information to each the image forming apparatus 20 via the gateway 30.

The configuration of the server 10 has been described heretofore.

[Configuration of Image Forming Apparatus]

Figure 9:
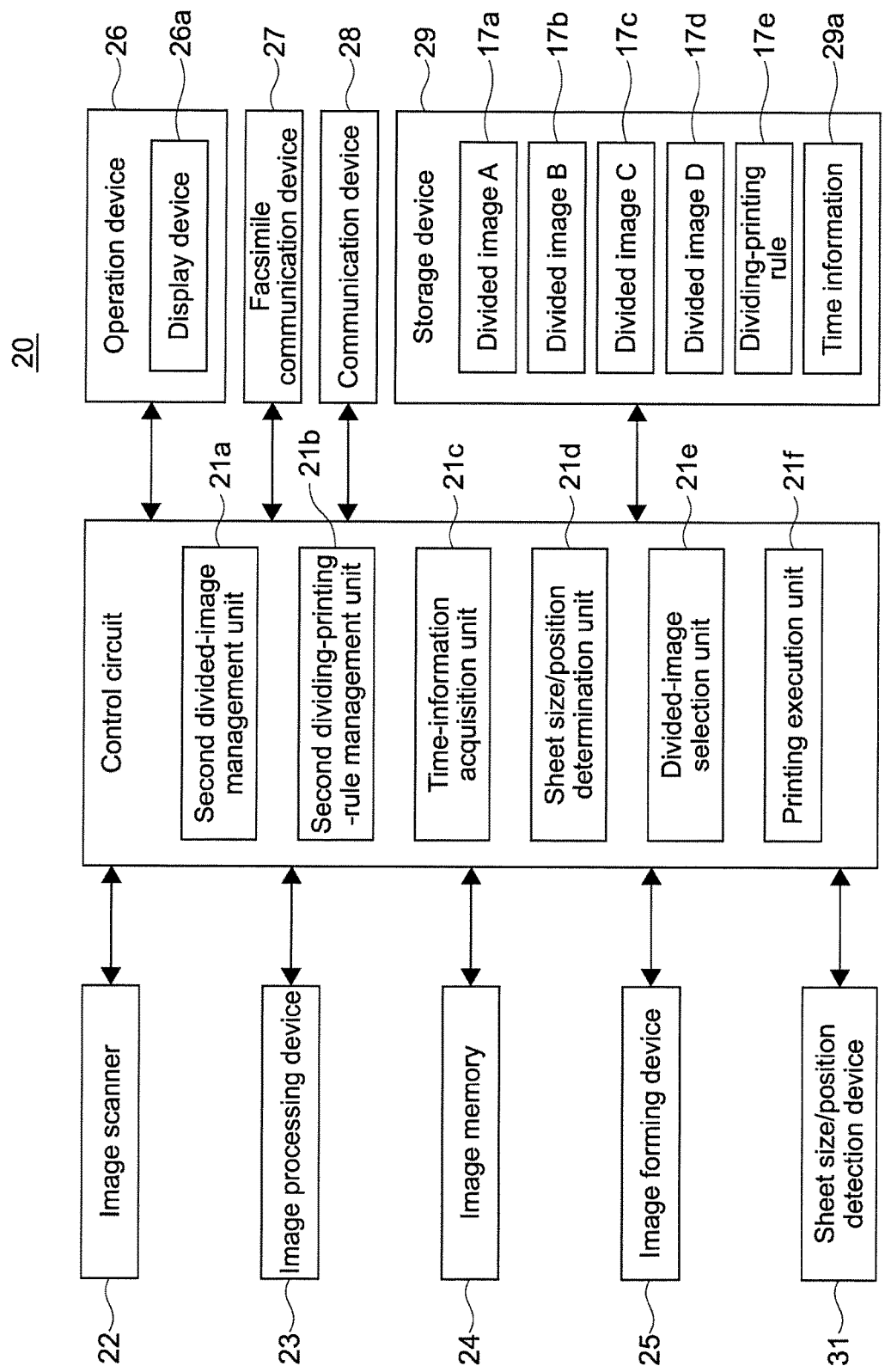
FIG. 9 schematically shows a configuration of an image forming apparatus 20.

Next, a configuration of the image forming apparatus 20 will be described. FIG. 9 schematically shows a configuration of the image forming apparatus 20.

The image forming apparatus 20 includes a controller circuit 21. The controller circuit 21 includes a CPU (second processor), a RAM, a ROM, dedicated hardware circuits, and the like and performs overall operational control of the image forming apparatus 20.

The controller circuit 21 is connected to an image scanner 22, an image processor 23, an image memory 24, an image forming device 25, an operation device 26, a display device 26a, a facsimile communication device 27, a communication device 28 (second communication device), a storage device 29 (second storage device), a sheet size/position detection device 31, and the like. The controller circuit 21 performs operational control of the respective devices connected thereto and sends/receives signals and data to/from those devices.

According to job execution instructions input by a user via the operation device 26 or a personal computer connected to a network, the controller circuit 21 controls drive and processing of mechanisms requisite for executing operational control of functions such as a scanner function, a printing function, a copy function, and a facsimile sending/receiving function.

Further, the controller circuit 21 includes a second divided-image management unit 21a (divided image management unit), a second dividing-printing-rule management unit 21b (dividing-printing rule management unit), a time-information acquisition unit 21c, a sheet size/position determination unit 21d, a divided-image selection unit 21e, and a printing execution unit 21f. The CPU of the image forming apparatus 20 loads a program (second information processing program), which is stored in a ROM or the like, in a RAM and executes the program. When the CPU of the image forming apparatus 20 executes the program, the CPU operates as the second divided-image management unit 21a, the second dividing-printing-rule management unit 21b, the time-information acquisition unit 21c, the sheet size/position determination unit 21d, the divided-image selection unit 21e, and the printing execution unit 21f, which are functional blocks.

The second divided-image management unit 21a acquires, from the server 10, the divided images 17a to 17d to be used for dividing-printing, and stores the acquired divided images 17a to 17d in the storage device 29.

The second dividing-printing-rule management unit 21b acquires, from the server 10, the dividing-printing rule 17e for determining which of the divided images 17a to 17d is used at the time of dividing-printing, and stores the acquired dividing-printing rule 17e in the storage device 29.

The time-information acquisition unit 21c acquires, from the server 10 (or the gateway 30), the time information, and stores the acquired time information in the storage device 29.

The sheet size/position determination unit 21d determines whether or not a size and a position of a printing sheet (mount of stamp rally) placed in a manual feed tray by a user are correct by a signal from the sheet size/position detection device 31.

In the case where the size and the position of the sheet are not appropriate, the sheet size/position determination unit 21d may display a message of that fact on the display device 26a to allow the user to replace the printing sheet.

Note that although whether or not the size and the position of the sheet are appropriate is determined in this example, the thickness, color, or front and back sides of the sheet may be determined.

The divided-image selection unit 21e selects, based on the time information 29a and the dividing-printing rule 17e, a divided image to be printed in the dividing-printing of stamp rally from the divided images 17a to 17d stored in the storage device 29, and determines the printing position.

The printing execution unit 21f controls the image forming device 25 to print the divided image selected by the divided-image selection unit 21e at the printing position.

The image scanner 22 reads an image from a script.

The image processor 23 carries out image processing as necessary on image data of an image read by the image scanner 22. For example, the image processor 23 corrects shading of an image read by the image scanner 22 and carries out other image processing to improve the quality of the image to be formed.

The image memory 24 includes an area that temporarily stores data of a script image read by the image scanner 22 or data to be printed by the image forming device 25.

The image forming device 25 forms an image of image data and the like read by the image scanner 22.

The operation device 26 includes a touch panel device and an operation key device that accept user's instructions on various operations and processing executable by the image forming apparatus 20. The touch panel device includes the display device 26a such as an LCD (Liquid Crystal Display) equipped with a touch panel.

The facsimile communication device 27 includes an encoding/decoding device, a modulation/demodulation device, and an NCU (Network Control Unit) (all of which are not shown) and transmits facsimiles using a public telephone network.

The communication device 28 is constituted of a communication module such as a LAN board and sends/receives various types of data to/from apparatuses such as the server 10 and the gateway 30 via a LAN connected to the communication device 28, and the like.

The storage device 29 stores a script image read by the image scanner 22, and the like. The storage device 29 is a large-volume storage device such as an HDD.

The sheet size/position detection device 31 detects the size and the position of the sheet placed in the manual feed tray by the user for performing dividing-printing of stamp rally, and transmits the detection signal to the sheet size/position determination unit 21d.

The configuration of the image forming apparatus 20 has been described heretofore.

[Flowchart of Processing (Transmission/Reception of Divided Image)]

Figure 10:
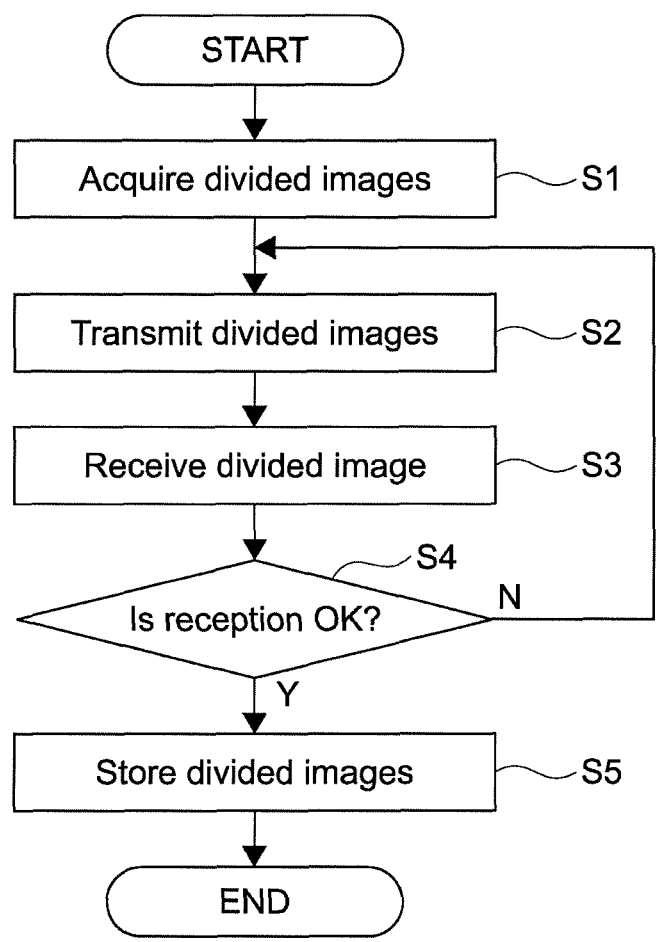
FIG. 10 shows a flowchart of processing of transmitting/receiving divided images 17a to 17d in the image forming system 1.

Next, a flowchart of processing of transmitting/receiving the divided images 17a to 17d in the image forming system 1 will be described. FIG. 10 shows a flowchart of processing of transmitting/receiving the divided images 17a to 17d in the image forming system 1.

First, the first divided-image management unit 11a of the server 10 acquires, from the administrator or the like, the divided images 17a to 17d obtained by dividing the original image such as a coupon (Step S1).

Next, the first divided-image management unit 11a transmits the acquired divided images 17a to 17d to the image forming apparatus 20 (Step S2).

Next, the second divided-image management unit 21a of the image forming apparatus 20 receives the divided images 17a to 17d (step S3).

Next, the second divided-image management unit 21a determines whether or not the reception of the divided images 17a to 17d is normally performed (Step S4).

In the case where the reception is not normally performed (N in Step S4), the processing returns to the processing of Step S2, and the first divided-image management unit 11a retransmits the divided images 17a to 17d.

In the case where the reception is normally performed (Y in Step S4), the second divided-image management unit 21a stores the received divided images 17a to 17d in the storage device 29 (Step S5).

Note that the above-mentioned processing may be performed every time the administrator or the like inputs a divided image corresponding to a new original image to the server 10.

The flowchart of the processing of transmitting/receiving the divided images 17a to 17d in the image forming system 1 has been described heretofore.

[Flowchart of Processing (Transmission/Reception of Dividing-Printing Rule)]

Figure 11:
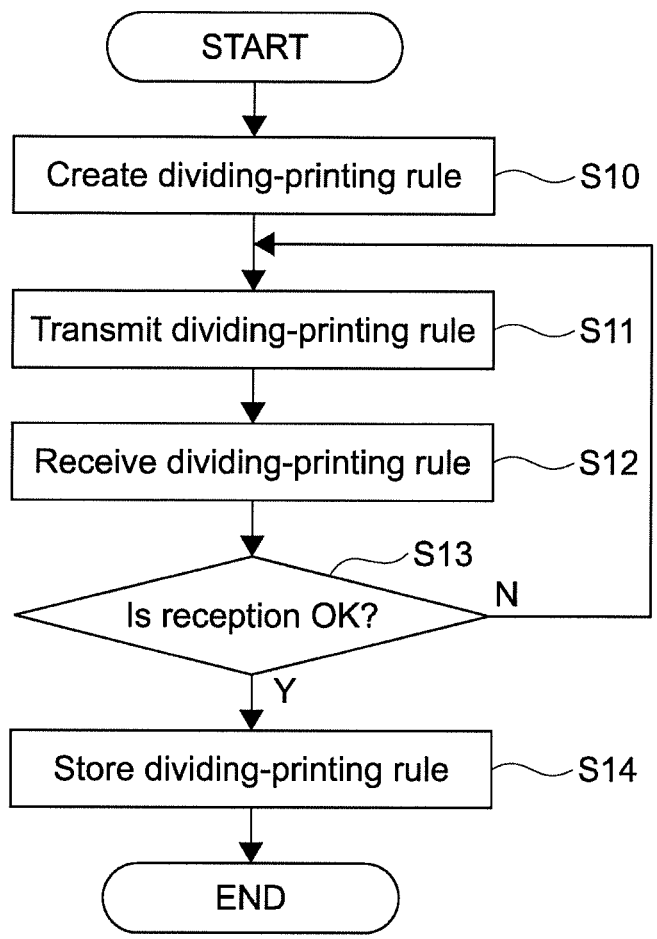
FIG. 11 shows a flowchart of processing of transmitting/receiving a dividing-printing rule 17e in the image forming system 1.

Next, a flowchart of processing of transmitting/receiving the dividing-printing rule 17e in the image forming system 1 will be described. FIG. 11 shows a flowchart of processing of transmitting/receiving the dividing-printing rule 17e in the image forming system 1.

First, the first dividing-printing-rule management unit 11b of the server 10 creates the dividing-printing rule 17e based on an instruction by the administrator or the like (Step S10).

Next, the first dividing-printing-rule management unit 11b transmits the created dividing-printing rule 17e to the image forming apparatus 20 (Step S11).

Next, the second dividing-printing-rule management unit 21b of the image forming apparatus 20 receives the dividing-printing rule 17e (Step S12).

Next, the second dividing-printing-rule management unit 21b determines whether or not the reception of the dividing-printing rule 17e is normally performed (Step S13).

In the case where the reception is not normally performed (N in Step S13), the processing returns to the processing of Step S11, and the first dividing-printing-rule management unit 11b retransmits the dividing-printing rule 17e.

In the case where the reception is normally performed (Yin Step S13), the second dividing-printing-rule management unit 21b stores the received dividing-printing rule 17e in the storage device 29 (Step S14).

Note that the above-mentioned processing may be performed in the case where a dividing-printing rule corresponding to a new original image is created or the case where the existing dividing-printing rule 17e is corrected, for example.

The flowchart of processing of transmitting/receiving the dividing-printing rule 17e in the image forming system 1 has been described heretofore.

[Flowchart of Processing (Transmission/Reception of Time Information)]

Figure 12:
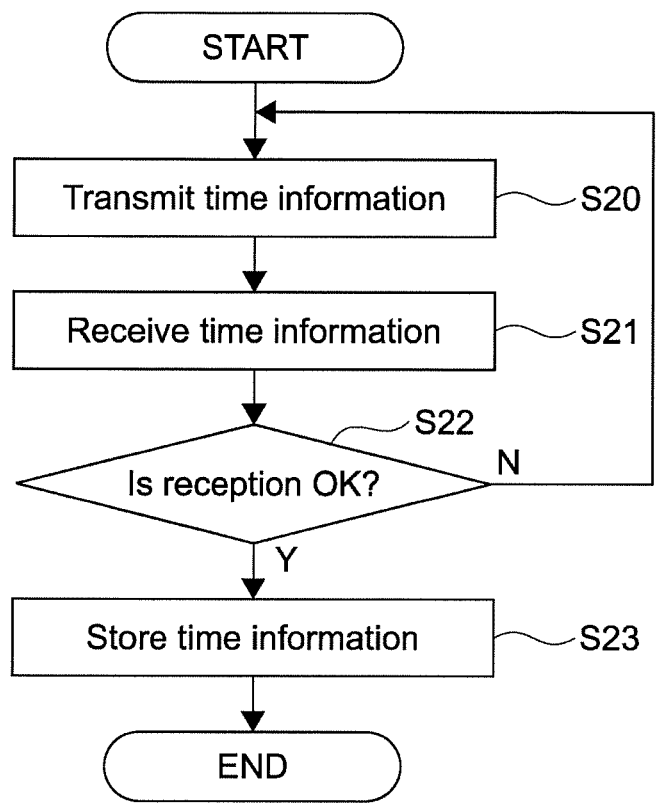
FIG. 12 shows a flowchart of processing of transmitting/receiving time information 29a in the image forming system 1.

Next, a flowchart of processing of transmitting/receiving the time information 29a in the image forming system 1 will be described. FIG. 12 shows a flowchart of the processing of transmitting/receiving the time information 29a in the image forming system 1.

First, the time-information management unit 11c of the server 10 transmits time information (day of the week and time) to the image forming apparatus 20 (Step S20).

Next, the time-information acquisition unit 21c of the image forming apparatus 20 receives the time information 29a (Step S21).

Next, the time-information acquisition unit 21c determines whether or not the reception of the time information 29a is normally performed (Step S22).

In the case where the reception is not normally performed (N in Step S22), the processing returns to Step S20, and the time-information management unit 11c retransmits the time information 29a.

In the case where the reception is normally performed (Y in Step 22), the time-information acquisition unit 21c stores the received time information 29a in the storage device 29 (Step S23).

Note that the above-mentioned processing is periodically performed in order to hold information on the correct day of the week and time in the image forming apparatus 20.

The flowchart of the processing of transmitting/receiving the time information 29a in the image forming system 1 has been described heretofore.

[Flowchart of Processing (when Performing Printing)]

Figure 13:
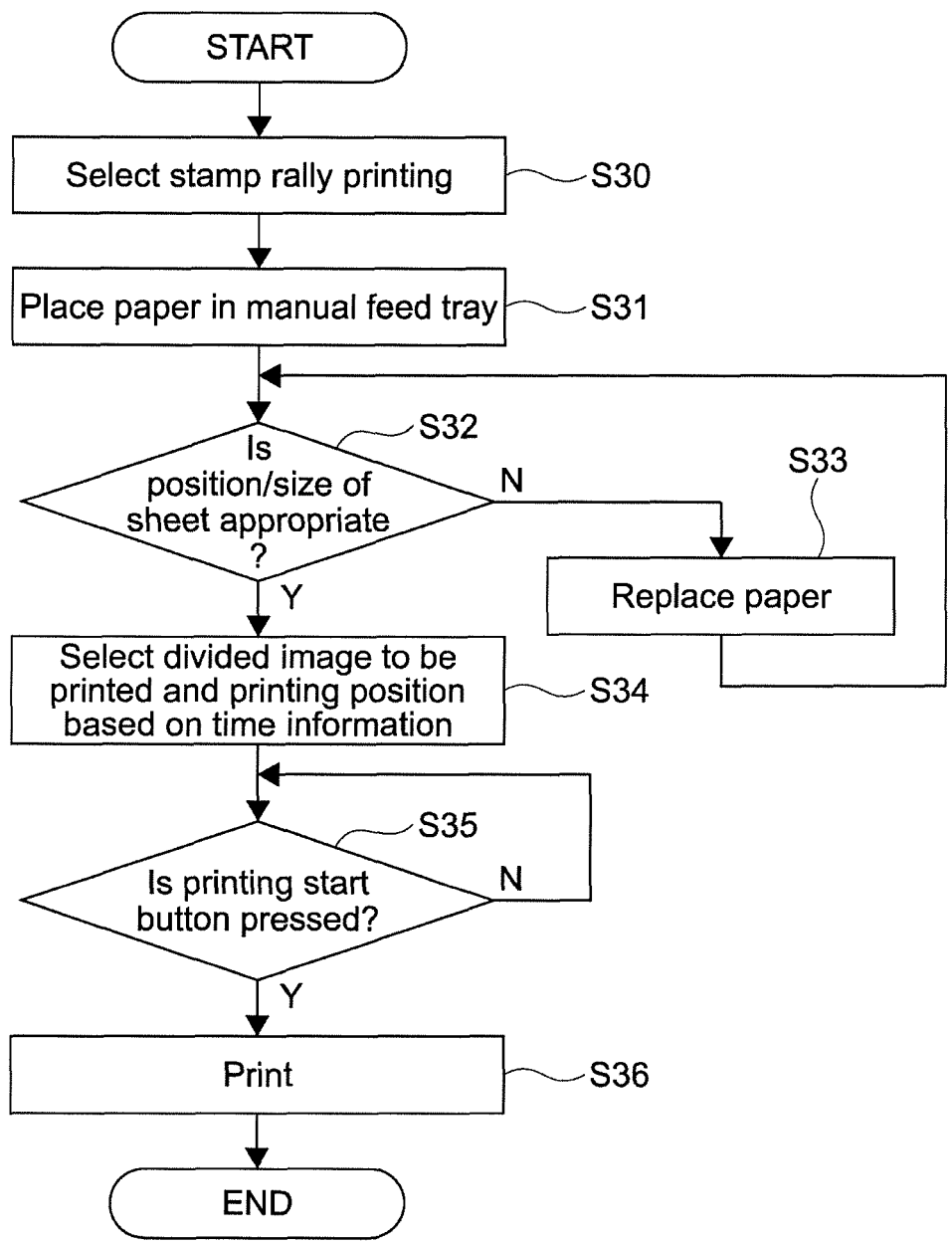
FIG. 13 shows a flowchart of processing when performing dividing-printing as stamp rally in the image forming system 1.

Next, a flowchart of processing when performing dividing-printing as stamp rally in the image forming system 1 will be described. FIG. 13 shows a flowchart of the processing when performing dividing-printing as stamp rally in the image forming system 1.

First, a user operates the operation device 26 to select stamp rally printing (Step S30).

Next, the user places a sheet in a manual feed tray (Step S31).

Next, the sheet size/position determination unit 21d determines, based on a signal of the sheet size/position detection device 31, whether or not the position and the size of the sheet for stamp rally printing are appropriate (Step S32).

In the case where the position and the size of the sheet are not appropriate (N in Step S32), the user replaces the sheet in the manual feed tray (Step S33), and the processing returns to Step 32.

In the case where the position and the size of the sheet are appropriate (Y in Step S32), the divided-image selection unit 21e selects the divided image to be printed and the printing position based on the time information 29a and the dividing-printing rule 17e stored in the storage device 29 (Step S34).

Next, the printing execution unit 21f determines whether or not a printing start button is pressed (Step S35).

In the case where the printing start button is not pressed (N in Step S35), the printing execution unit 21f stands by until the printing start button is pressed.

In the case where the printing start button is pressed (Y in Step S35), the printing execution unit 21f controls the image forming device 25 to perform printing (Step S36).

The flowchart of the processing when performing dividing-printing as stamp rally in the image forming system 1 has been described heretofore.

The first embodiment has been described heretofore.

Second Embodiment

Next, a second embodiment will be described. Note that in the following, only a part different from the first embodiment will be described.

In the first embodiment, all of the divided images are downloaded to and stored in the image forming apparatus 20, and the image forming apparatus 20 selects, on the basis of the time information acquired from the server 10, the divided image to be printed. Meanwhile, in the second embodiment, a server 10B stores all of the divided images, and the server 10B performs the selection of the divided image using the time information. Only information on the divided image and the printing position as the selection result is transmitted from the sever 10B to an image forming apparatus 20B every time printing is performed.

[Configuration of Server]

Figure 14:
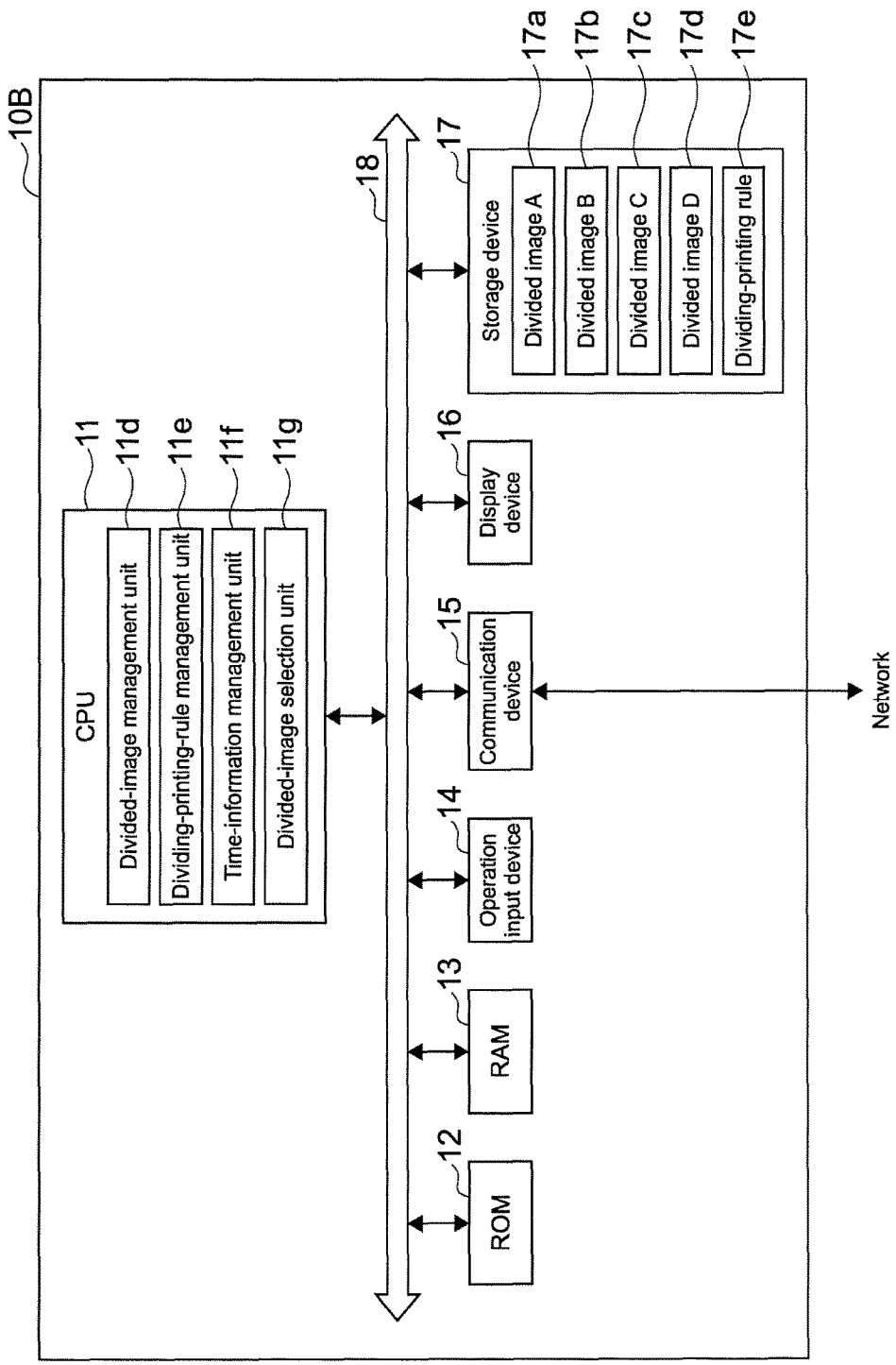
FIG. 14 shows a configuration diagram in the case where a server 10B according to a second embodiment of the present disclosure is a general-purpose computer.

Next, a configuration of the server 10B will be described. The server 10B may be constituted of dedicated hardware or software, or may be a general-purpose computer. FIG. 14 shows a configuration diagram in the case where the server 10B is a general-purpose computer.

As shown in FIG. 14, the server 10B includes the CPU 11, the ROM 12, the RAM 13, the operation input device 14, the communication device 15 (first communication device), the display device 16, and the storage device 17 (first storage device), and these blocks are connected to each other via the bus 18.

The functional blocks that the CPU 11 of the server 10 realizes include a divided-image management unit 11d, a dividing-printing-rule management unit 11e, a time-information management unit 11f, and a divided-image selection unit 11g.

The divided-image management unit 11d acquires, from an administrator of the server 10B or the like, the divided image 17a to 17d obtained by dividing an original image such as a coupon, and stores the acquired divided images 17a to 17d in the storage device 17.

The dividing-printing-rule management unit 11e acquires the dividing-printing rule 17e created by the administrator of the server 10B or the like, and stores the acquired dividing-printing rule 17e in the storage device 17.

The time-information management unit 11f holds the present day of the week and time as time information.

The divided-image selection unit 11g selects, based on the time information provide from the time-information management unit 11f and the dividing-printing rule 17e stored in the storage device 17, a divided image to be printed in the dividing-printing of stamp rally from the divided images 17a to 17d stored in the storage device 17, and provides the selected divided image in response to a request from the image forming apparatus 20B.

The configuration of the server 10B has been described heretofore.

[Configuration of Image Forming Apparatus]

Figure 15:
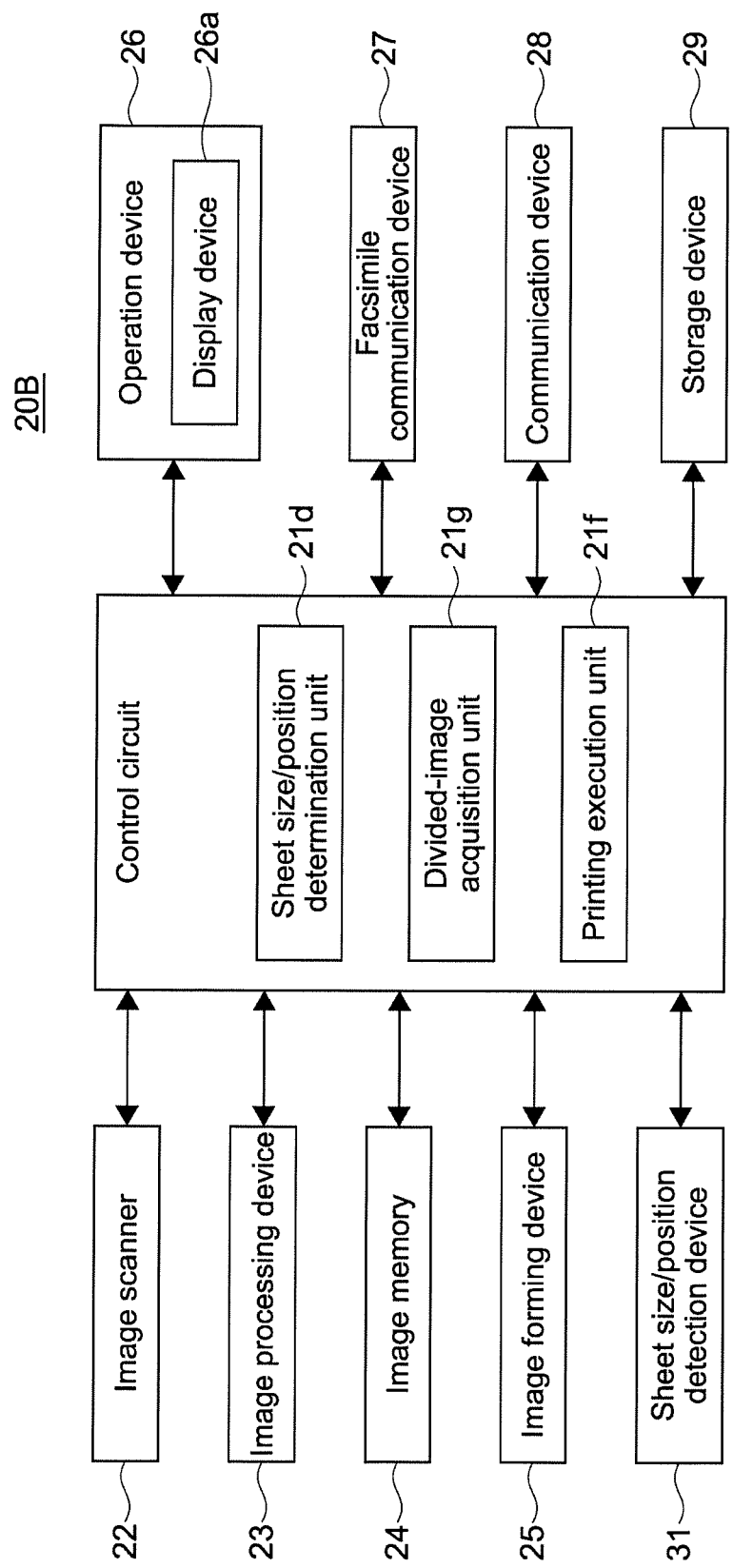
FIG. 15 schematically shows a configuration of an image forming apparatus 20B.

Next, a configuration of the image forming apparatus 20B will be described. FIG. 15 schematically shows a configuration of the image forming apparatus 20B.

The image forming apparatus 20B includes the controller circuit 21. The controller circuit 21 includes a CPU (second processor), a RAM, a ROM, dedicated hardware circuits, and the like and performs overall operational control of the image forming apparatus 20.

The controller circuit 21 is connected to the image scanner 22, the image processor 23, the image memory 24, the image forming device 25, the operation device 26, the display device 26a, the facsimile communication device 27, the communication device 28 (second communication device), the storage device 29 (second storage device), the sheet size/position detection device 31, and the like. The controller circuit 21 performs operational control of the respective devices connected thereto and sends/receives signals and data to/from those devices.

The controller circuit 21 includes the sheet size/position determination unit 21d, a divided-image acquisition unit 21g, and the printing execution unit 21f. The CPU of the image forming apparatus 20B loads a program (second information processing program), which is stored in a ROM or the like, in a RAM and executes the program. When the CPU of the image forming apparatus 20B executes the program, the CPU operates as the sheet size/position determination unit 21d, the divided-image acquisition unit 21g, and the printing execution unit 21f which are functional blocks.

The sheet size/position determination unit 21d determines whether or not a size and a position of a printing sheet (mount of stamp rally) placed in a manual feed tray by a user are correct by a signal from the sheet size/position detection device 31.

The divided-image acquisition unit 21g requests, from the server 10B, information on the divided image and the printing position to be used for dividing-printing, and acquires the divided image provided from the server 10B.

The printing execution unit 21f controls the image forming device 25 to print the divided image acquired by the divided-image acquisition unit 21g at the printing position.

The configuration of the image forming apparatus 20B has been described heretofore.

[Flowchart of Processing (when Performing Printing)]

Figure 16:
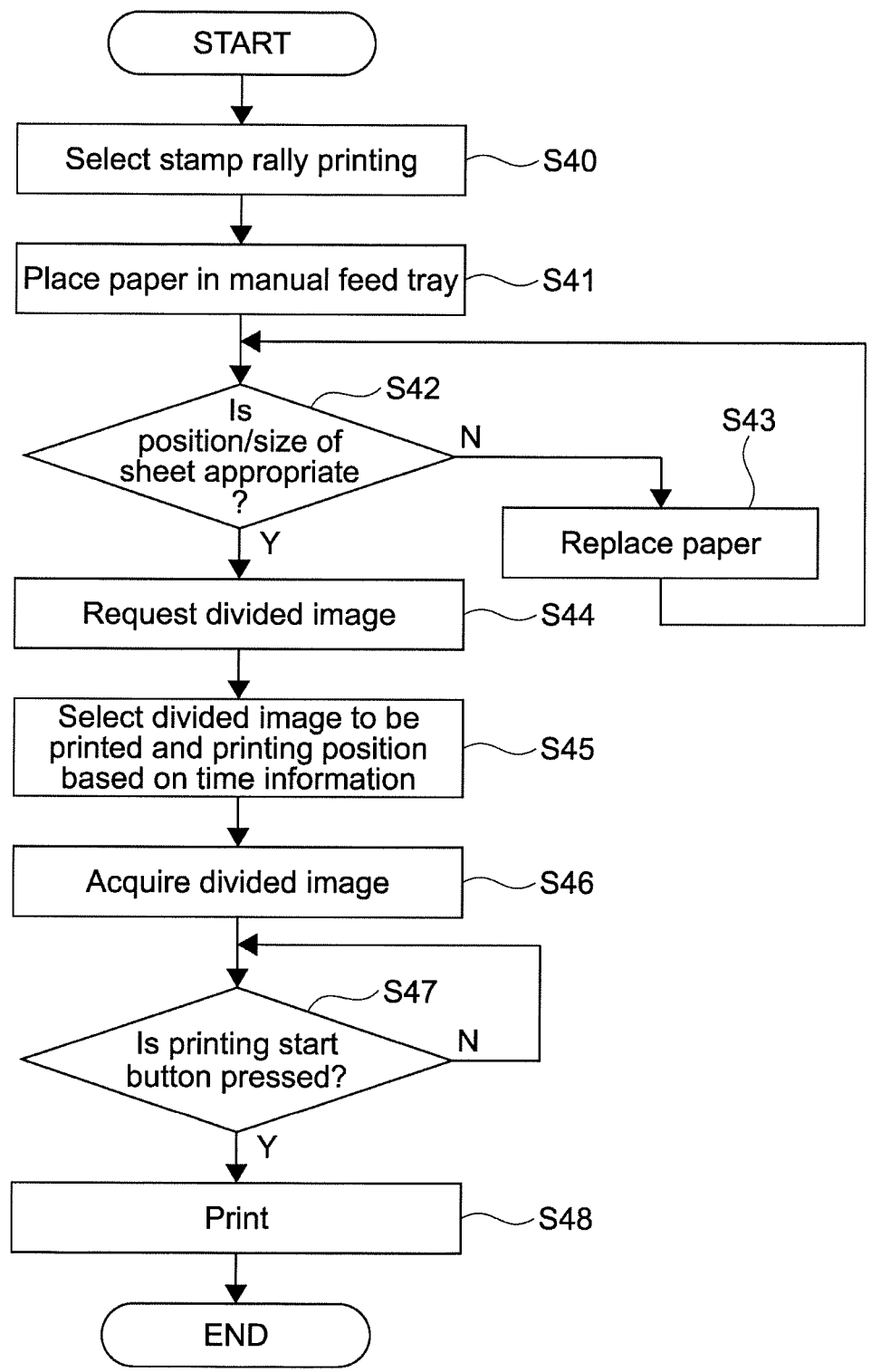
FIG. 16 shows a flowchart of processing when performing dividing-printing as stamp rally in an image forming system 1B.

Next, a flowchart of processing when performing dividing-printing as stamp rally in an image forming system 1B will be described. FIG. 16 shows a flowchart of processing when performing dividing-printing as stamp rally in the image forming system 1B.

First, a user operates the operation device 26 of the image forming apparatus 20B to select stamp rally printing (Step S40).

Next, the user places a sheet in a manual feed tray (Step S41).

Next, the sheet size/position determination unit 21d of the image forming apparatus 20B determines, based on a signal of the sheet size/position detection device 31, whether or not the position and the size of the sheet for stamp rally printing are appropriate (Step S42).

In the case where the position and the size of the sheet are not appropriate (N in Step S42), the user replaces the sheet in the manual feed tray (Step S43), and the processing returns to Step 42.

In the case where the position and the size of the sheet are appropriate (Y in Step S42), the divided-image acquisition unit 21g of the image forming apparatus 20B requests a divided image to be printed from the server 10B (Step S44).

Next, the divided-image selection unit 11g of the server 10B selects, based on the time information and the dividing-printing rule 17e stored in the storage device 17, the divided image to be printed and the printing position in response to a request from the image forming apparatus 20B, and transmits the selected divided image and printing position to the image forming apparatus 20B (Step S45).

Next, the divided-image acquisition unit 21g of the image forming apparatus 20B acquires, from the server 10B, the divided image to be printed and the printing position (Step S46).

Next, the printing execution unit 21f of the image forming apparatus 20B determines whether or not the printing start button is pressed (Step S47).

In the case where the printing start button is not pressed (N in Step S47), the printing execution unit 21f stands by until the printing start button is pressed.

In the case where the printing start button is pressed (Y in Step S47), the printing execution unit 21f controls the image forming device 25 to perform printing (Step S48).

The flowchart of processing when performing dividing-printing as stamp rally in an image forming system 1B has been described heretofore.

The second embodiment has been described heretofore.

Modified Example 1

Note that each divided image does not necessary need to have a size equal to one quarter of the size of the original image as described above. Alternatively, the size of the divided image may be the same as that of the original image. For example, in the image shown in FIG. 3, only a part located on the upper left after the four division may have the same image data as of the original image, and other parts (upper right, lower left, and lower right) may have transparent image data.

In the case where the size of each divided image is the same as that of the original image and only one quarter of the divided image has the same image data as that of the original image, there is no need to separately provide information on the printing position because the image has the information on the printing position.

Modified Example 2

Note that in the above description, a sheet to be used for stamp rally printing is placed in a manual feed tray. Alternatively, for example, a thick paper for stamp rally may be prepared in a specific tray, and the thick paper may be fed from the tray only at the time of first printing.

Modified Example 3

Note that in the above description, the original image is a discount coupon. Alternatively, for example, the original image may be a character image of an art work or a famous animation work.

Modified Example 4

Note that in the above description, the original image is equally divided into four images. Alternatively, for example, the original image may be unequally divided as long as the resulting divided image constitutes a part of the original image.

Modified Example 5

Note that in the above description, the image division is performed by dividing the areas of the image. Alternatively, for example, the original image may be divided by colors. For example, only a magenta part of the original image is printed for the first printing, and only a cyan part of the original image is printed for the second printing.

Modified Example 6

Note that the administrator may manually determine, regarding all the times, which divided image is printed, and the dividing-printing rule may be stored in the storage device 17 of the server 10. Alternatively, the administrator may determine the dividing-printing rule only regarding the first time (e.g., on Monday in the case where the time is day of the week), and the image forming system 1 may determine the dividing-printing rule by automatically changing the divided image to be printed (shifting one by one in the example shown in FIG. 7) regarding the next day and subsequent days.

Modified Example 7

Note that in the example shown in FIG. 7, in the case where the original image is divided into four images, the printing time zone of 24 hours is also equally divided into four. Alternatively, for example, 24 hours may be divided into eight. In the case of a user who desires to complete a coupon in one day, it takes a whole day for the user to complete the coupon in the case of four division. However, in the case where 24 hours is divided into eight and the divided images A to D are printed in the order of the time zone, the user can complete the coupon in half a day.

Modified Example 8

Note that regarding the dividing-printing rule, it does not necessarily need to equally divide 24 hours as shown in FIG. 7 in the division of the time zone. For example, the division of the time zone may be performed so that the divided image A, the divided image B, the divided image C, and the divided image D are respectively printed between 0:00 to 10:59, between 11:00 to 11:59, between 12:00 to 12:59, and between 13:00 to 23:59. In the case of performing such division of the time zone, the user can efficiently complete the coupon by visiting the shop four times at equal intervals between 10:00 to 14:00.

Note that in the above-mentioned embodiments and the modified examples, the time defined in the dividing-printing rule is the day of the week and/or time zone. Alternatively, the time defined in the dividing-printing rule may be the time other than the day of the week and/or time zone.

[Supplementary Note]

In order to improve the printing efficiency by combining an image forming apparatus and a server, for example, such technology that the use frequency for each user is summed up to calculate the printing priority, and the order of transmitting the printing job from a printer server to the image forming apparatus is controlled based on the calculated priority in order to equalize the use opportunities of an image forming apparatus shared on the network, is conceivable.

Further, as the technology for dividing an image and printing the divided image, for example, such technology that in a method of creating, after a script image is divided and the divided images are printed, a large poster by combining the divided images, the printing page is output after the user checks the dividing position of the image to be printed or the layout of the divided image in each page, is conceivable.

Typically, the method of dividing a script image and printing the divided image has been used only the time when printing a poster having a size larger than a sheet size that can be printed in one printing. That is, the dividing-printing has not been used for promoting visits to convenience stores.

Meanwhile, according to the present disclosure, it is possible to allow customers to visit convenience stores by causing the customers to print divided images obtained by dividing an original image.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming system, comprising:

a server; and an image forming apparatus connected to the server via a network, the server including a first communication device that communicates with the image forming apparatus, a first storage device, a first ROM that stores a first information processing program, and a first processor that executes the first information processing program, the image forming apparatus including a second communication device that communicates with the server, a second storage device, an image forming device that forms an image, a second ROM that stores a second information processing program, and a second processor, wherein the first processor of the server executes the first information processing program to acquire a plurality of divided images, store the plurality of divided images in the first storage device, and provide the plurality of divided images to the image forming apparatus, the plurality of divided images being obtained by dividing an original image, all of the plurality of divided images being to be combined to be the original image, acquire a dividing-printing rule, store the dividing-printing rule in the first storage device, and provide the dividing-printing rule to the image forming apparatus, the dividing-printing rule being for determining which divided image of the plurality of divided images is printed at which position, information on a divided image to be printed and a printing position of the divided image to be printed being described in the dividing-printing rule for each time when printing the image to be printed, and provide present time to the image forming apparatus as time information, and the second processor of the image forming apparatus executes the second information processing program to acquire the plurality of divided images to be printed from the server, and store the divided images in the second storage device, acquire the dividing-printing rule from the server, and store the dividing-printing rule in the second storage device, acquire the time information from the server, and store the time information in the second storage device, select, based on the time information and the dividing-printing rule, the divided image to be printed from the plurality of divided images stored in the second storage device, and determine the printing position of the divided image to be printed, and control the image forming device to print the selected divided image at the printing position.

2. The image forming system according to claim 1, wherein the second processor of the image forming apparatus executes the second information processing program to further detect a size and a position of a sheet placed on a manual feed tray, determine whether or not the size and the position of the sheet placed on the manual feed tray are correct, and allow, in a case where the size and the position of the sheet are not appropriate, a user to replace the sheet.

3. The image forming system according to claim 1, wherein the divided images are obtained by equally or unequally dividing an area of the original image.

4. The image forming system according to claim 1, wherein the divided images are obtained by dividing the original image by colors.

5. The image forming system according to claim 1, wherein the dividing-printing rule describes information on the divided image to be printed and the printing position for time when the printing is performed first, and information for changing the divided image to be printed and the printing position for time when the printing is performed for the second and subsequent times.

6. An image forming system, comprising:

a server; and an image forming apparatus connected to the server via a network, the server including a first communication device that communicates with the image forming apparatus, a storage device, a first ROM that stores a first information processing program, and a first processor that executes the first information processing program, the image forming apparatus including a second communication device that communicates with the server, an image forming device that forms an image, a second ROM that stores a second information processing program, and a second processor, wherein the first processor of the server executes the first information processing program to acquire a plurality of divided images, and store the plurality of divided images in the storage device, the plurality of divided images being obtained by dividing an original image, all of the plurality of divided images being to be combined to be the original image, acquire a dividing-printing rule, and store the dividing-printing rule in the storage device, the dividing-printing rule being for determining which divided image of the plurality of divided images is printed at which position, information on a divided image to be printed and a printing position of the divided image to be printed being described in the dividing-printing rule for each time when printing the image to be printed, hold present time as time information, and select, based on the time information and the dividing-printing rule, the divided image to be printed from the plurality of divided images stored in the storage device, determine the printing position of the divided image to be printed, and provide information on the selected divided image and the determined printing position in response to a request from the image forming apparatus, and the second processor of the image forming apparatus executes the second information processing program to request information on the divided image and the printing position to be printed from the server, and acquire the information on the divided image and the printing position provided from the server, and control the image forming device to print the acquired divided image at the printing position.

7. The image forming system according to claim 6, wherein
the second processor of the image forming apparatus executes the second information processing program to further
detect a size and a position of a sheet placed on a manual feed tray,
determine whether or not the size and the position of the sheet placed on the manual feed tray are correct, and
allow, in a case where the size and the position of the sheet are not appropriate, a user to replace the sheet.

8. The image forming system according to claim 6, wherein
the divided images are obtained by equally or unequally dividing an area of the original image.

9. The image forming system according to claim 6, wherein
the divided images are obtained by dividing the original image by colors.

10. The image forming system according to claim 6, wherein
the dividing-printing rule describes
information on the divided image to be printed and the printing position for time when the printing is performed first, and
information for changing the divided image to be printed and the printing position for time when the printing is performed for the second and subsequent times.

11. An image forming method for an image forming system including a server and an image forming apparatus connected to each other via a network, the method comprising:
by the server,
acquiring a plurality of divided images, storing the plurality of divided images in a first storage device, and providing the plurality of divided images to the image forming apparatus, the plurality of divided images being obtained by dividing an original image, all of the plurality of divided images being to be combined to be the original image;
acquiring a dividing-printing rule, storing the dividing-printing rule in the first storage device, and providing the dividing-printing rule to the image forming apparatus, the dividing-printing rule being for determining which divided image of the plurality of divided images is printed at which position, information on a divided image to be printed and a printing position of the divided image to be printed being described in the dividing-printing rule for each time when printing the image to be printed; and
providing present time to the image forming apparatus as time information; and
by the image forming apparatus,
acquiring the plurality of divided images to be printed from the server, and storing the divided images in a second storage device;
acquiring the dividing-printing rule from the server, and storing the dividing-printing rule in the second storage device;
acquiring the time information from the server, and storing the time information in the second storage device;
selecting, based on the time information and the dividing-printing rule, the divided image to be printed from the plurality of divided images stored in the second storage device, and determining the printing position of the divided image to be printed; and
controlling the image forming device to print the selected divided image at the printing position.

* * * * *